United States Patent
Park et al.

(10) Patent No.: US 10,171,212 B2
(45) Date of Patent: Jan. 1, 2019

(54) METHOD AND DEVICE FOR PERFORMING CHANNEL ESTIMATION

(71) Applicant: LG Electronics Inc., Seoul (KR)

(72) Inventors: Hanjun Park, Seoul (KR); Kijun Kim, Seoul (KR); Hyungtae Kim, Seoul (KR); Jonghyun Park, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 15/303,894

(22) PCT Filed: Jul. 3, 2015

(86) PCT No.: PCT/KR2015/006874
§ 371 (c)(1),
(2) Date: Oct. 13, 2016

(87) PCT Pub. No.: WO2016/003235
PCT Pub. Date: Jan. 7, 2016

(65) Prior Publication Data
US 2017/0041113 A1 Feb. 9, 2017

Related U.S. Application Data

(60) Provisional application No. 62/021,013, filed on Jul. 4, 2014.

(51) Int. Cl.
*H04B 7/00* (2006.01)
*H04L 5/00* (2006.01)
(Continued)

(52) U.S. Cl.
CPC ............ *H04L 5/0048* (2013.01); *H04B 7/04* (2013.01); *H04B 7/0456* (2013.01);
(Continued)

(58) Field of Classification Search
CPC ............ H04W 72/02; H04W 72/0406; H04W 72/042; H04W 72/046; H04W 72/1226; H04W 72/1284
(Continued)

(56) References Cited

U.S. PATENT DOCUMENTS 8,467,469 B2 * 6/2013 Lee, II ................ H04B 7/0473
370/334
9,225,478 B2 * 12/2015 Chen ..................... H04W 28/08
(Continued)

FOREIGN PATENT DOCUMENTS

WO 2013173679 A1 11/2013
WO 2014039056 A1 3/2014
(Continued)

*Primary Examiner* — Dmitry Levitan
(74) *Attorney, Agent, or Firm* — Dentons US LLP

(57) ABSTRACT

A method for reporting a channel state on a downlink channel transmitted through M antenna ports that are 2-dimensionally arranged according to an embodiment of the present invention may be performed by a terminal and include a step of receiving a channel state information-reference signal (CSI-RS) setting for N virtual antenna ports that are formed by applying beam-forming to a group of vertical antennas of the 2-dimensionally arranged M antenna ports, and a step of calculating channel state information on the downlink channel by using the received CSI-RS setting to report the channel state information to a serving cell, wherein the reported channel state information may include information on a rotational transformation related to a first code word of a codebook related to a combination of Q unit vectors that are orthogonal in an N dimension space.

8 Claims, 11 Drawing Sheets

(51) Int. Cl.
*H04B 7/04* (2017.01)
*H04B 7/06* (2006.01)
*H04B 7/0456* (2017.01)

(52) U.S. Cl.
CPC ............ *H04B 7/0482* (2013.01); *H04B 7/06* (2013.01); *H04B 7/063* (2013.01); *H04B 7/0617* (2013.01); *H04B 7/0634* (2013.01); *H04B 7/0639* (2013.01); *H04L 5/0057* (2013.01); *H04L 5/005* (2013.01); *H04L 5/0051* (2013.01)

(58) Field of Classification Search
USPC .......................... 370/310, 328, 329, 339, 349
See application file for complete search history.

(56) References Cited

U.S. PATENT DOCUMENTS

| | | | |
|---|---|---|---|
| 9,397,738 B2* | 7/2016 | Xu | H04B 7/0417 |
| 2011/0274188 A1* | 11/2011 | Sayana | H04B 7/0639 |
| | | | 375/260 |
| 2016/0337864 A1* | 11/2016 | Song | H01Q 1/246 |

FOREIGN PATENT DOCUMENTS

| | | |
|---|---|---|
| WO | 2014065564 A1 | 5/2014 |
| WO | 2014099343 A1 | 6/2014 |

\* cited by examiner

FIG. 5
RELATED ART
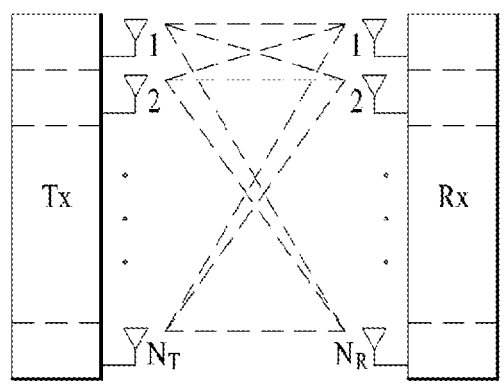
(a)
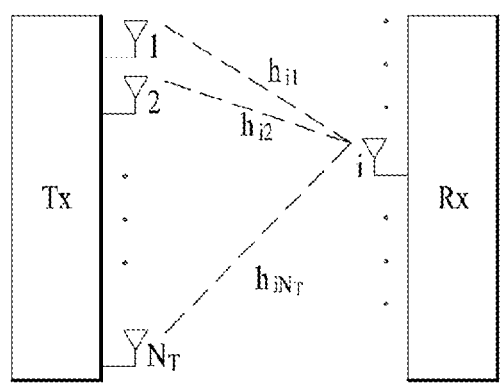
(b)

METHOD AND DEVICE FOR PERFORMING CHANNEL ESTIMATION

This application is a 35 USC § 371 National Stage entry of International Application No. PCT/KR2015/006874 filed on Jul. 3, 2015, and claims priority to U.S. Provisional Application No. 62/021,013 filed on Jul. 4, 2014, all of which are hereby incorporated by reference in their entireties as if fully set forth herein.

TECHNICAL FIELD

The present invention relates to a wireless communication system, and more particularly, to a method for performing channel state reporting through channel estimation using some antenna ports and a device for the same.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention devised to solve the problem lies in a method for efficient channel state reporting and a signaling method related to efficient channel state reporting.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for performing channel state reporting on a downlink channel transmitted through M two-dimensionally arranged antenna ports, the method being implemented by a terminal and including receiving a channel state information-reference signal (CSI-RS) configuration for N virtual antenna ports formed by applying beamforming to each vertical antenna group of the M two-dimensionally arranged antenna ports, and calculating channel state information (CSI) about the downlink channel using the received CSI-RS configuration and reporting the same to a serving cell, wherein the reported CSI includes information about rotational transformation of a first codeword in a codebook for a combination of Q unit vectors orthogonal to each other in an N-dimensional space.

Additionally or alternatively, the method may further include transmitting, to the serving cell, an indicator indicating whether the rotational transformation is accumulated and applied for most recently transmitted CSI.

Additionally or alternatively, wherein, when the indicator is transmitted to the serving cell, the first codeword may be excluded from the reported CSI.

When the indicator indicates that the rotational transformation is not accumulated to be applied to the most recently transmitted CSI, a default codeword may be used in place of the first codeword.

Additionally or alternatively, the reported CSI may contain the first codeword and a second codeword acquired through rotational transformation of the first codeword.

In another aspect of the present invention, provided herein is a terminal configured to perform channel state reporting on a downlink channel transmitted through M two-dimensionally arranged antenna ports, the terminal including a radio frequency (RF) unit, and a processor configured to control the RF unit, wherein the processor is configured to receive a channel state information-reference signal (CSI-RS) configuration for N virtual antenna ports formed by applying beamforming to each vertical antenna group of the M two-dimensionally arranged antenna ports, and calculate channel state information (CSI) about the downlink channel using the received CSI-RS configuration and report the same to a serving cell, wherein the reported CSI includes information about rotational transformation of a first codeword in a codebook for a combination of Q unit vectors orthogonal to each other in an N-dimensional space.

Additionally or alternatively, the processor may be configured to transmit, to the serving cell, an indicator indicating whether the rotational transformation is accumulated and applied for most recently transmitted CSI.

Additionally or alternatively, when the indicator is transmitted to the serving cell, the first codeword may be excluded from the reported CSI.

When the indicator indicates that the rotational transformation is not accumulated to be applied to the most recently transmitted CSI, a default codeword is used in place of the first codeword.

Additionally or alternatively, the reported CSI may contain the first codeword and a second codeword acquired through rotational transformation of the first codeword.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, channel state reporting through channel estimation using some antenna ports may be enabled. Thereby, efficiency of antenna port configuration for channel state reporting may be enhanced, and efficient channel state reporting may be implemented.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a block diagram illustrating multiple-input multiple-output (MIMO) used in a 3GPP LTE/LTE-A system;

BEST MODE

Figure 1:
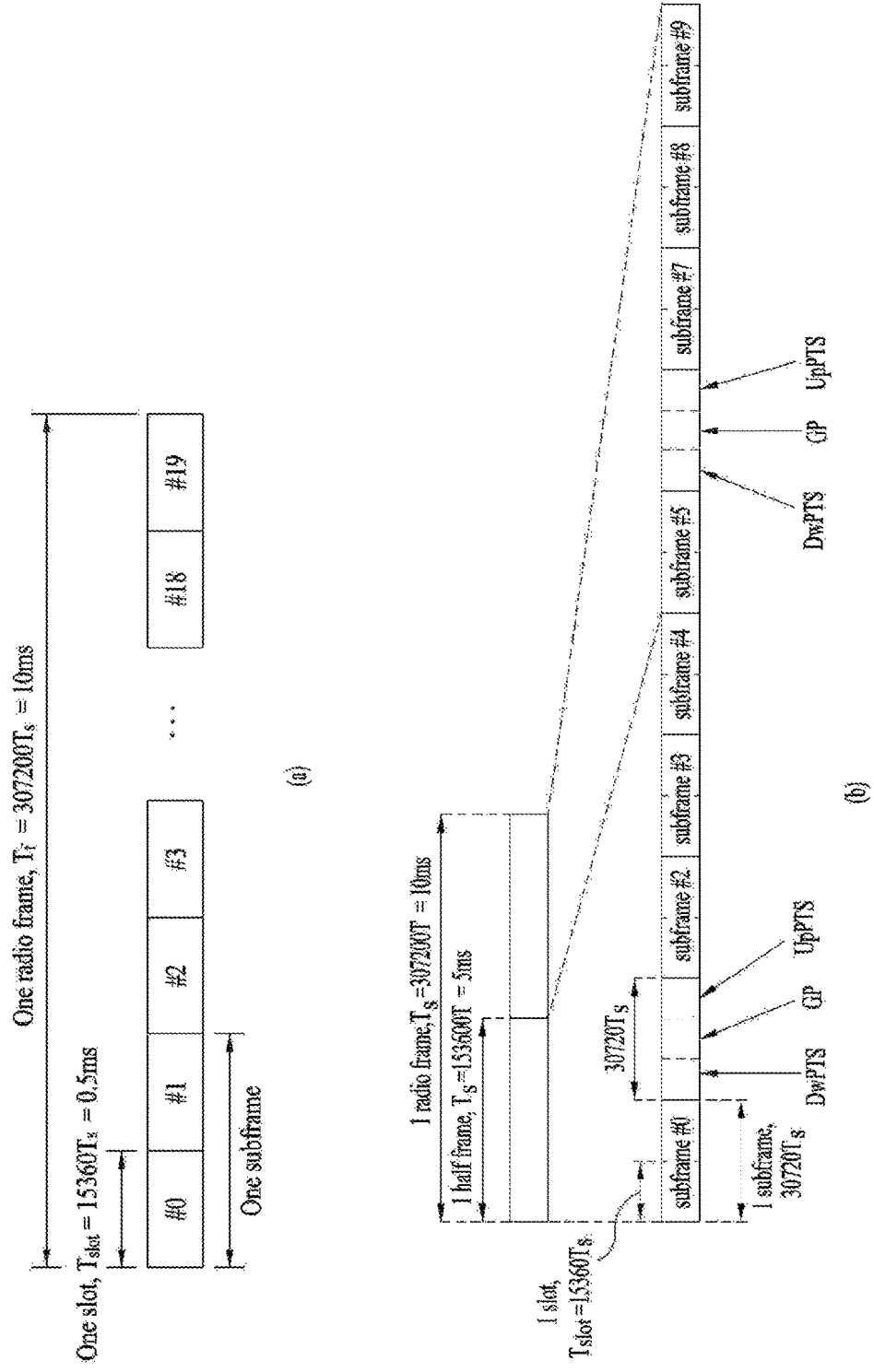
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term ' UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term ' BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link.

At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (1-DD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
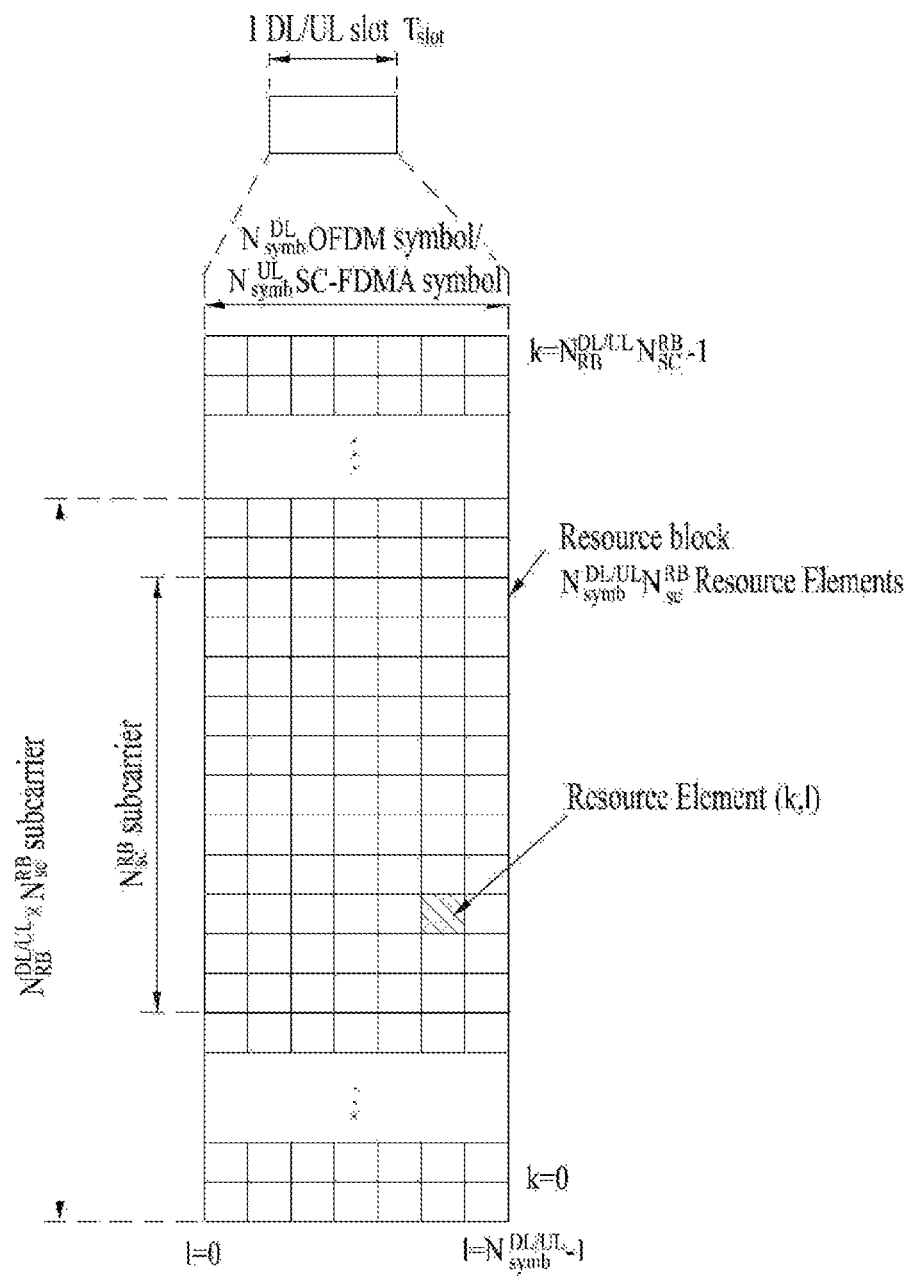
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{SC}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
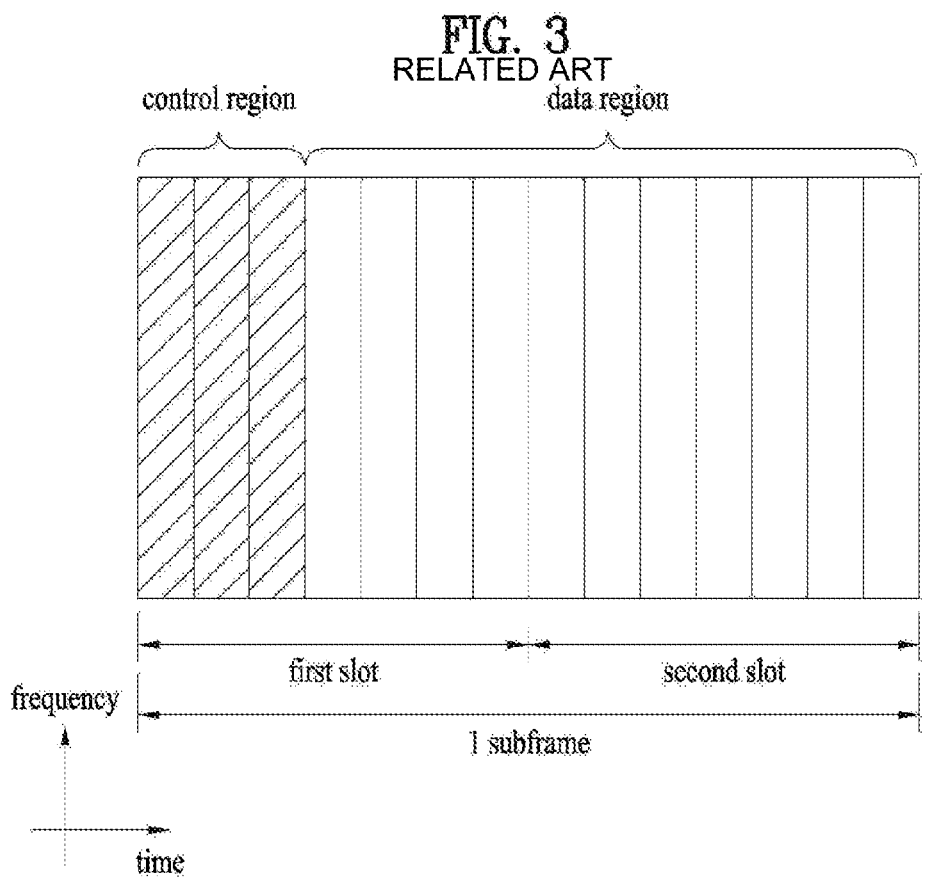
FIG. 3 is a diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
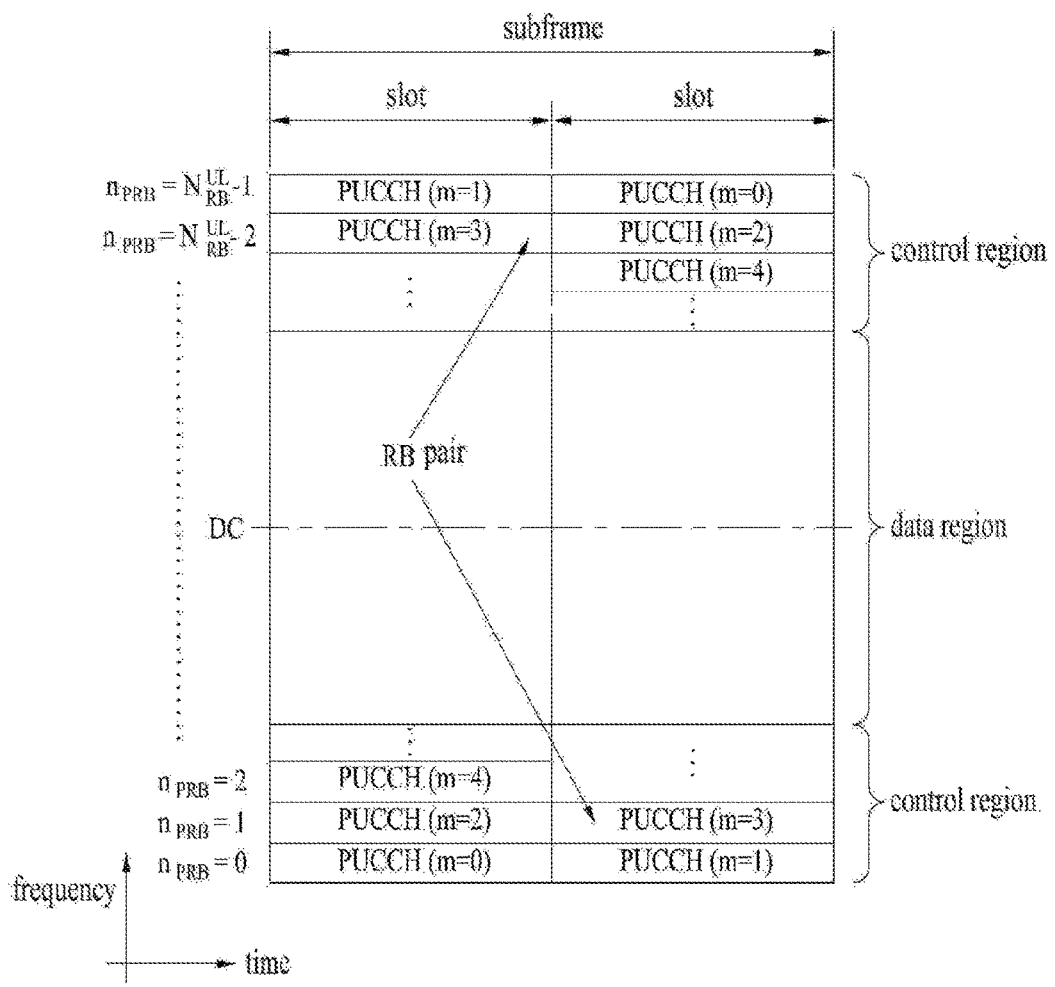
FIG. 4 is a diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 shows the configuration of a wireless communication system including multiple antennas.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

Individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_R}$ may be represented as the following vector.

$$y[y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
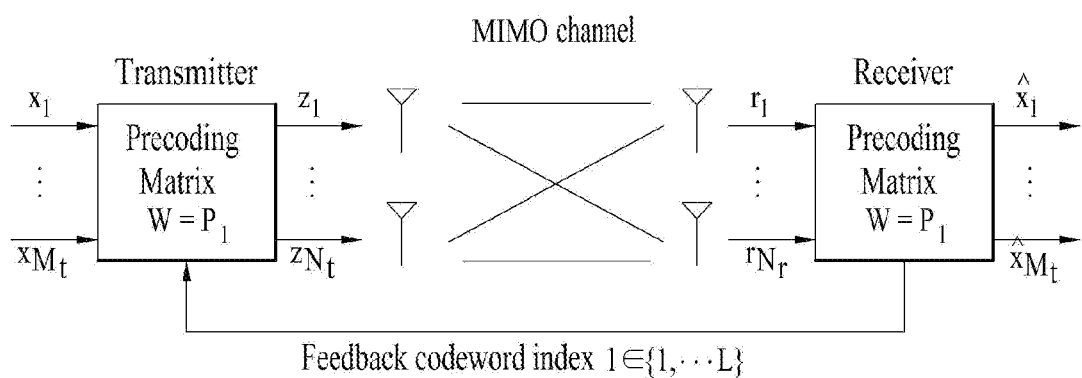
FIG. 6 illustrates codebook-based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (+1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Configuration of Multiple Antennas

Figure 7:
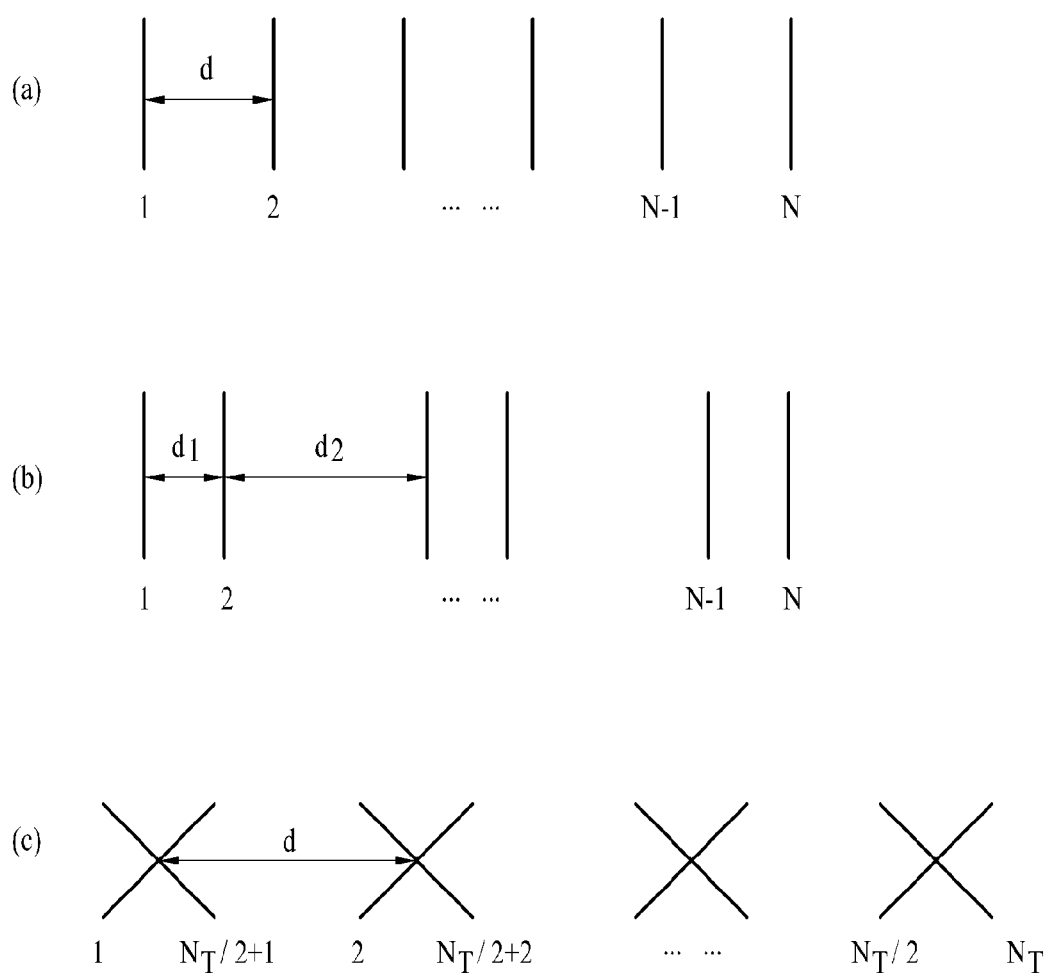
FIG. 7 illustrates configuration of 8 transmit (Tx) antennas.

FIG. 7 illustrates configuration of 8 transmit (Tx) antennas.

FIG. 7(a) illustrates a case where N antennas constitute independent channels without being grouped. This antenna array is typically called a uniform linear array (ULA). When the number of antennas is small, the ULA configuration may be used. However, if the number of antennas is large, space for the transmitter and/or receiver may not be sufficient to spatially separate and dispose the multiple antennas to configure independent channels.

FIG. 7(a) illustrates a paired ULA configured by pairing every two antennas. In this case, an associated channel may be shared by a pair of two channels and be independent from the channels of other pairs of channels.

In contrast with legacy 3GPP LTE Release-8/9, which employs 4 Tx antennas for downlink, 3GPP LTE Release-10 or later systems may employ 8 Tx antennas for downlink. To use such extended antenna configuration, multiple Tx antennas need to be installed in an insufficient space, and accordingly the ULA antenna configuration as shown in FIGS. 7(a) and 7(b) may not be appropriate. Accordingly, a dual-pole (or cross-pole or cross polarization) antenna configuration as shown in FIG. 7(c) may be applied. If Tx antennas are configured in this way, independent channels may be configured by lowering correlation of antennas even if the distance d between the antennas is relatively short, and therefore data transmission with high throughput may be possible.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be a periodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4bit)<br>2nd wideband CQI(4bit)<br>if RI > 1<br>N*Subband PMI(4bit)<br>(N is the total # of subbands)<br>(if 8Tx Ant,<br>N*subband W2 + wideband W1) |
| | UE selected (Subband CQI) | | Mode 2-0<br>RI (only for Open-loop SM)<br>1st wideband CQI(4bit) + Best-M CQI(2bit)<br>(Best-M CQI; An average CQI for M SBs selected from among N SBs)<br>Best-M index (L bit) | Mode 2-2<br>RI<br>1st wideband CQI(4bit) + Best-M CQI(2bit)<br>2nd wideband CQI(4bit) + Best-M CQI(2bit) if RI > 1<br>Best-M index (L bit)<br>Wideband PMI(4bit) + Best-M PMI(4bit)<br>(if 8Tx Ant,<br>wideband W2 + Best-M W2 + wideband W1) |

TABLE 8-continued

|  | PMI Feedback Type | | |
|---|---|---|---|
|  | No PMI | Single PMI | Multiple PMIs |
| Higher Layer-configured (Subband CQI) | Mode 3-0 RI (only for Open-loop SM) 1st wideband CQI(4bit) + N*subbandCQI(2bit) | Mode 3-1 RI 1st wideband CQI(4bit) + N*subbandCQI(2bit) 2nd wideband CQI(4bit) + N*subbandCQI(2bit) if RI > 1 Wideband PMI(4bit) (if 8Tx Ant, wideband W2 + wideband W1) | Mode 3-2 RI 1st wideband CQI(4bit) + N*subbandCQI(2bit) 2nd wideband CQI(4bit) + N*subbandCQI(2bit) if RI > 1 N*Subband PMI(4bit) (N is the total # of subbands) (if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

Figure 9:
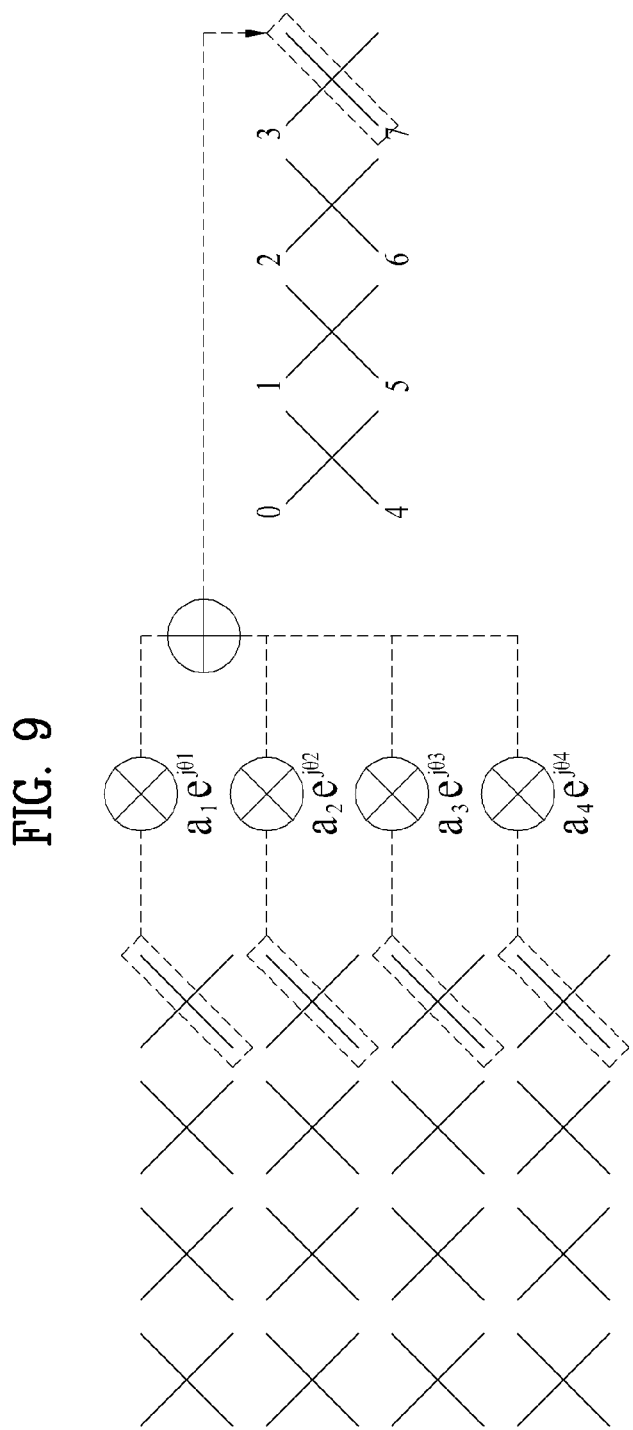
FIG. 9 illustrates antenna port virtualization according to an embodiment of the present invention.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

In advanced wireless communication systems such as LTE-A, each cell may have multiple Tx antennas and support a MIMO technique for transmitting data obtained through a precoding matrix (PM) using the multiple Tx antennas. The MIMO technique may include an operation such as spatial multiplexing (SM) or transmit diversity (TxD) and contribute to improvement of system performance. To support the MIMO technique, the UE may feed back information about directionality of a channel in the form of a codebook such that a serving cell of the UE may select a correct PM. For example, when a codebook is configured using K bits, the codebook consists of 2K codewords, and each of the codewords expresses a specific PM. In this case, the UE may feed back, to the serving cell, information indicating a specific codeword in the codebook, using the K bits.

Preferably, the codebook is designed in consideration of a real channel environment. For example, in the LTE system, the Rel-12 4tx codebook and 8tx codebook are designed by dividing the PMI into two codebooks: $W^{(1)}$ having long term and wideband properties and $W^{(2)}$ having short term and subband properties. In this case, as one method for determining the final PMI, hierarchical codebook transformation may be performed as $W=\text{norm}(W^{(1)}W^{(2)})$ by utilizing the two kinds of channel information. Herein, norm(A) denotes transformation of normalizing matrix A such that the norm value of each column of A is 1. For example, the 8Tx codebook for 8 Tx antennas defined in the LTE-A system may be defined as a codebook in a dual structure from the perspective of the aforementioned hierarchical coding design. Specifically, the 8Tx codebook may be expressed as the following equation.

$$W^{(1)}(i) = \begin{bmatrix} X_i & 0 \\ 0 & X_i \end{bmatrix}, \text{ where } X_i \text{ is } Nt/2 \text{ by } M \text{ matrix} \quad [\text{Equation 12}]$$

$$W^{(2)}(j) = \begin{bmatrix} \overbrace{e_M^k \quad e_M^l \quad \cdots \quad e_M^m}^{r\ columns} \\ \alpha_j e_M^k \quad \beta_j e_M^l \quad \gamma_j e_M^m \end{bmatrix} \text{ (if rank = } r\text{),}$$

where $1 \leq k, l, m \leq M$ and $k, l, m$ are integer.

Typically, an antenna has antenna elements positioned on the same line in the form of a uniform linear array (ULA), and a certain distance in proportion to a wavelength is equally maintained between any two neighboring antenna elements. Alternatively, an antenna having a cross polarization property may be configured based on the polarization property of radio waves. That is, an antenna element having a horizontal polarization property and an antenna element having a vertical polarization property may be placed at the same position. This arrangement is spatially efficient in physically configuring an antenna array. In the LTE-A system, cross polarization antennas are used in designing the 8Tx codebook. If the distance between the antennas is short, namely if the distance between the neighboring antennas is less than or equal to half the signal wavelength, the relative phase difference of a generated channel is considered. An example of cross polarization antennas is shown in FIG. 7(c). The cross polarization antennas may be divided into an antenna group having a vertical polarization property and an antenna group having a horizontal polarization property. Each group has the ULA antenna property, and antenna elements of the two antenna groups may be placed at the same position.

In advanced wireless communication systems including LTE Rel-12, introduction of an active antenna system (AAS) is considered. In contrast with the conventional passive antenna system having an active circuit capable of adjusting the phase and amplitude of a signal and an antenna which are separated from each other, the AAS is configured by active antennas each including an active circuit. As the active antennas are used for the AAS, the AAS does not require a separate cable, a connector and other hardware for connecting the active circuit to the antennas. Accordingly, the AAS is very efficient in terms of energy and operation costs. In particular, since the AAS supports electronic beam control for each antenna, the AAS enables advanced MIMO technologies for, for example, precise beam pattern formation based on the beam direction and beam width or 3D beam pattern formation.

Figure 8:
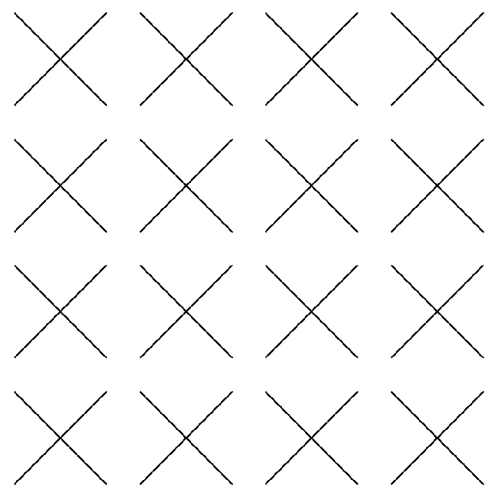
FIG. 8 illustrates a 2-dimensional antenna array.

As advanced antenna systems such as the AAS are introduced, a massive MIMO structure having multiple input/output antennas and a multidimensional antenna structure is also considered. For example, in contrast with the conventional linear antenna array, when a 2D antenna array is configured, a 3D beam pattern may be formed according to the active antennas of the AAS. When the 3D beam pattern is used from the perspective of the BS, sectorization of a beam in both horizontal and vertical directions may be considered. FIG. 8 illustrates a massive MIMO structure of 32 antenna ports for cross polarization antennas arranged in 4 columns and 4 rows.

In the LTE system, application of vertical beamforming is considered for the 2D massive MIMO structure. That is, by applying beamforming to vertical antenna ports in FIG. 8, one virtual antenna port is formed. In this way, the 32 antenna ports may be transformed into 8 vertical antenna ports as shown in FIG. 9.

UEs provided with data services based on the 8 virtual antenna ports obtained by applying vertical beamforming need to have a codebook for a PM to be applied at the virtual antenna ports. For example, for the LTE system, the 8Tx codebook defined in Rel-10 may be reused. However, as can be seen from FIG. 9, the virtual antenna ports have a channel gain and phase change according to vertical beamforming. Accordingly, the Rel-10 8Tx codebook, which assumes linear increase of phase within an antenna group and the same phase difference for antenna groups having different polarization properties on the assumption of a ULA, is not suitable for a vertical antenna port channel. That is, as an error between the LTE Rel-10 8Tx codebook and a real channel is added for multiple antenna ports through, for example, vertical beamforming, the error with respect to the virtual channels may further increase.

Accordingly, the present invention proposes that, when M antenna ports are present in a massive MIMO system, and the M antennas are transformed into N virtual antenna ports using, for example, the vertical beamforming technique, a specific codebook for the N antenna ports be corrected in consideration of the difference in magnitude and phase between the channels of the virtual antenna ports. Hereinafter, a description will be given of operation of the present invention in the LTE system. However, it should be noted that the present invention is applicable to any wireless communication system which employs the massive MIMO structure.

Correction of Codebook by Hadamard Product (1.1) Delivery of Information about Antenna Ports Subjected to Correction According to an embodiment of the present invention, in the case where N virtual antenna ports are formed through transformation of M antenna ports, when the BS configures a CSI feedback procedure for the N antenna ports, information about P antenna port sets subjected to channel gain correction may be signaled to the UE along with configuration information about the CSI feedback procedure.

In this case, the i-th antenna port set consists of L, ($\leq$N) antenna ports. As an example of the operation, when a CSI-RS for the N virtual antenna ports is transmitted and a CSI process including the CSI-RS is configured in the LTE system, the BS needs to deliver, to the UE, information about the antenna ports subjected to channel gain correction because the UE does not know information about the antenna port configuration in the BS. For example, in the example of FIG. 8, the channel gain obtained by the vertical antenna ports may be expressed as a product of a channel gain according to vertical beamforming and a channel gain according to horizontal beamforming. Accordingly, if the LTE Rel-10 8Tx codebook which does not consider vertical beamforming is used, additional correction for vertical beamforming may be needed. To this end, the BS may designate antenna port sets {0, 1, 2, 3} and {4, 5, 6, 7}, which have the same polarization property, and instruct the UE to perform the feedback operation of correcting a channel gain for the sets. Alternatively, the BS may designate an antenna port set {0, 1, 2, 3, 4, 5, 6, 7} and instruct the UE to correct the channel gain. Alternatively, in the example of FIG. 9, the value of phase difference between antennas having different polarization properties according to vertical beamforming may vary among antenna pairs having different polarization properties. That is, in FIG. 9, the phase difference according to a polarization difference between antenna port 0 and antenna port 4 may differ from the phase difference between antenna port 1 and antenna port 5. In this case, according to operation of the present invention, the BS may signal, to the UE, an antenna port set configured as {0, 1, 2, 3} and instruct the UE to perform phase correction for the antenna port set. Thereby, correction may be performed such that the phase differences according to the polarization properties are expressed by a single value among the antenna groups according to the LTE Rel-10 codebook.

(1.2) Definition of a Codebook for Channel Gain Correction (1.2.1) Correction in an Antenna Port Set According to an embodiment of the present invention, in the case where N virtual antenna ports are formed through transformation of M antenna ports, codebooks for channel gain correction $C_n(R_1)$, $C_n(R_2)$, ..., $C_n(R_S)$ may be defined for a set of S antenna port numbers $\{R_1, R_2, \ldots, R_S\}$ which is pre-agreed between the BS and the UE and includes $R_1$, $R_2$, ..., and $R_S$ as the numbers of antenna ports, the size of an antenna port to be corrected in the operation of item (1.1) may be set to $R_i$ from among $\{R_1, R_2, \ldots, R_S\}$, and the UE may feed back an index indicating a codeword in the codebook $C_S(R_i)$ as channel gain information in the antenna port set.

For example, suppose that an antenna port set {0, 1, 2, 3, 4, 5, 6, 7} is configured in the embodiment of FIG. 9. In this case, the phase difference between the 8 virtual antenna ports according to vertical beamforming may not maintain the property of linear increase of phase according to the ULA structure anymore, and a new codebook reflecting randomness of the magnitude of a channel and phase difference in contrast with the existing codebook may be defined. For example, a codeword of a codebook for channel gain correction for an antenna port set configured by R antenna ports may be expressed as the following equation.

$$v(\rho, \theta) = [\rho_0 \ \rho_1 e^{j\theta_1} \ \cdots \ \rho_{R-1} e^{j\theta_{R-1}}]^T \qquad \text{[Equation 13]}$$

$$\text{where } \rho = [\rho_0, \cdots, \rho_{R-1}]^T, \ \|\rho\| = \sqrt{|\rho_0|^2 + \cdots + |\rho_{R-1}|^2} = 1$$

$$\theta = [\theta_1, \cdots, \theta_{R-1}]^T$$

For example, a new codebook may be a Grassmannian codebook generated by the Lloyd algorithm. Alternatively, the codeword of the new codebook may be configured by only phase information as expressed in the following equation.

$$v(\theta) = [1 e^{j\theta_1} \ldots e^{j\theta_{R-1}}]^T \text{ where } \theta = [\theta_1, \ldots, \theta_{R-1}]^T \qquad \text{[Equation 14]}$$

Alternatively, the existing codebook may be reused. For example, in the embodiment of FIG. 9, if the BS signals an antenna port set configured as {0, 1, 2, 3} and instructs that only phase correction should be performed as expressed in Equation 14, the LTE Rel-8 4Tx codebook may be reused. If there is information about an antenna port set for channel gain correction in the CSI feedback procedure configured for the UE, the UE may feed back codeword index information about the codebook for channel gain correction for each antenna port set.

(1.2.2) Correction Between Antenna Port Sets

According to an embodiment of the present invention, in the case where N virtual antenna ports are formed through transformation of M antenna ports, and the BS instructs the UE to perform channel gain correction for P ($\geq$2) antenna port sets, the BS may configure the antenna port sets such that the antenna port sets are ordered, and the UE may feed back the difference in phase or size between antenna port set i ($\geq$2) and antenna port set i−1 using information about the difference in phase or size between specific antenna ports in the antenna port set. For example, in the embodiment of FIG. 9, suppose that two antenna port sets {0, 1, 2, 3} and {4, 5, 6, 7} are configured, and suppose that the codeword of the codebook $C_S(4)$ for each antenna port set is selected as expressed in the following equation.

$$v_0 = [\rho_{0,0} \rho_{0,1} e^{j\theta_{0,1}} \rho_{0,2} e^{j\theta_{0,2}} \rho_{0,3} e^{j\theta_{0,3}}]^T \text{ for } \{0,1,2,3\}$$

$$v_1 = [\rho_{1,0} \rho_{1,1} e^{j\theta_{1,1}} \rho_{1,2} e^{j\theta_{1,2}} \rho_{1,3} e^{j\theta_{1,3}}]^T \text{ for } \{4,4,6,7\}$$

$$\text{where } \sqrt{|\rho_{i,0}|^2 + \ldots + |\rho_{i,R-1}|^2} = 1 \text{ for } i=0,1 \qquad \text{[Equation 15]}$$

As can be seen from Equation 15, a codeword of a codebook is represented by only a phase and magnitude relative to the first codeword, and accordingly a phase difference between two different antenna port sets is not given. Accordingly, the UE needs to additionally feed back information indicating the relationship between the two antenna port sets. According to this embodiment, information about the difference in phase or size between specific antenna ports of the respective antenna port sets may be fed back as the feedback information. For example, when two antenna port sets {0, 1, 2, 3} and {4, 5, 6, 7} are configured, the value of difference in phase and size between port 0 and port 4 may be separately fed back. That is, the specific antenna ports may be the first antenna ports in the respective antenna port sets.

When the UE performs the feedback operation according to the operations of items (1.2.1) and (1.2.2), the BS may estimate a vector for a correction value of the channel gain to be corrected for each of the N antenna ports and normalize the vector such that the magnitude of the vector becomes 1. The normalized vector may be expressed by the following equation.

$$v_S = [\rho_0 \rho_1 e^{j\Theta_1} \ldots \rho_{N-1} e^{j\Theta_{N-1}}]^T$$

$$\text{where } \sqrt{|\rho_0|^2 + \ldots + |\rho_{N-1}|^2} = 1 \quad \text{[Equation 16]}$$

(1.3) PM Feedback (1.3.1) Hadamard Product-Based Correction

According to an embodiment of the present invention, in the case where N virtual antenna ports are formed through transformation of M antenna ports, when a PM is calculated for the N virtual antenna ports, each column of a specific PM for the N virtual antenna ports according to the existing codebook, which does not consider the transformation procedure, may be corrected through Hadamard product by an S-vector generated according to the operation of item (1.2) to yield a final PM. For example, suppose that a specific PM for r layers and N antenna ports is selected according to the LTE Rel-10 codebook as expressed by the following equation.

$$W = [w_1 w_2 \ldots w_r] \text{ where } w_i = [w_{i,1} w_{i,2} \ldots w_{i,N}]^T \quad \text{[Equation 17]}$$

If the S-vector is given by Equation 16, the final PM may be expressed by the following equation.

$$W_{new} = [v_S \circ w_1 \, v_S \circ w_2 \ldots v_S \circ w_r]$$

$$\text{where } w_i = [w_{i,1} w_{i,2} \ldots w_{i,N}]^T, (A \circ B)_{ij} = (A)_{ij} \cdot (B)_{ij} \quad \text{[Equation 18]}$$

Herein, the symbol "∘" denotes Hadamard product. Accordingly, when the UE performs a PM feedback operation, the UE may find a combination of an existing codebook-based PM and an S-vector which is most suitable for the N virtual antenna ports, and feed back codeword indexes of a codebook according to the operation of item (1.2) while performing PMI feedback for the existing codebook.

(1.3.2) Determination and Feedback of Beam Set-Based S-Vector Information

According to an embodiment of the present invention, in the case where N virtual antenna ports are formed through transformation of M antenna ports, when a PM for the N virtual antenna ports is fed back, and there is a sub-codebook expressing a beam set consisting of P specific beams for the respective codewords as a sub-codebook of the existing codebook that does not consider the transformation procedure, a combination of the beam set and the S-vector which minimizes the sum of the distances between the P new beams generated according to the combination and the channel of the N virtual antenna ports may be selected.

In the LTE system according to this embodiment, for the LTE Rel-10 8Tx codebook, a sub-codebook $W^{(1)}$ representing a specific beam set including multiple DFT beams constituting each codeword is defined by Equation 12. Herein, $W^{(1)}$ denotes relatively long-term channel information. Short-term channel information is denoted by $W^{(2)}$ in Equation 12 and represents an operation of selecting a polarization phase between antenna groups and a specific beam in the beam set. Accordingly, in consideration of an environment where the vertical beamforming is semi-statically determined, the UE may feed back a combination of a beam set such as the codebook $W^{(1)}$ and an S-vector for correcting the beam set. For example, the UE may select a combination of a beam set consisting of P beams (e.g., $w_1, \ldots, w_P$) and an S-vector (e.g., $v_s$) as in Equation 19.

$$\arg\min_{w_1,\ldots,w_P,v_S} \sum_{1 \le i \le P} \|\hat{h} - v_S \circ w_i\|^2 \quad \text{[Equation 19]}$$

Herein, $\hat{h}$ denotes a normalized channel vector for N virtual antenna ports. Alternatively, the BS may separately transmit a CSI-RS for N horizontal antenna ports to which vertical beamforming has not been applied, such that the UE may identify and estimate horizontal components. The UE may select, based only on the channel value from the CSI-RS, a specific PM for the N antenna ports according to an existing codebook that does not consider the vertical beamforming effect, and then select an S-vector for optimizing the selected horizontal PM for the virtual channel value based on the channel value from a CSI-RS for N virtual antenna ports obtained through vertical beamforming. Alternatively, the UE may not use a separate CSI-RS to which vertical beamforming has not been applied. Instead, the UE may determine a PM by utilizing an existing codebook based on a channel having the greatest power value among channels for respective paths of the virtual channels while utilizing a CSI-RS to which vertical beamforming is applied, and then select an S-vector that reflects the channels best in consideration of all paths.

Correction of Codebook According to Rotation in Constrained Space

In the example of FIG. 9, the channels of the N virtual antenna ports may have an arbitrary beam direction in an N-dimensional space. On the other hand, the LTE Rel-10 8Tx codebook may not reflect the virtual antenna port channel well since it is designed to fit a specific antenna structure. Hereinafter, a description will be given of a more generalized correction method for diverting a beam set concentrated in a specific beam direction through rotational transformation within dimensions limited in consideration of feedback load.

(2.1) 2-D Rotation Feedback

According to an embodiment of the present invention, in the case where N virtual antenna ports are formed through transformation of M antenna ports, the BS and the UE may define a codebook for a combination of two orthogonal unit vectors in an N-dimensional space, and a rotation angle θ expressed by a codebook combination of $v_1$, $v_2$ and K bits may be fed back such that the UE signals a rotation by which the UE corrects a specific beam or beam set.

Figure 10:
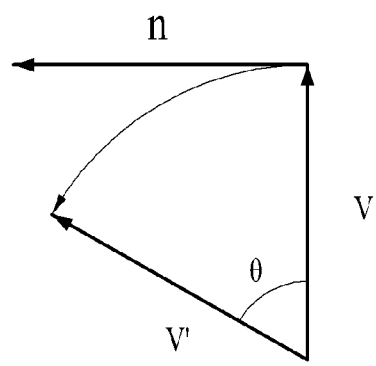
FIG. 10 illustrates rotational transformation of a vector or codeword.

Rotation of a real vector v may be expressed by a tangent vector n having the same magnitude as v and a rotation angle θ in the direction of rotation, as shown in FIG. 10. Herein, a vector $v_R$ produced by the rotation may be expressed by the following equation.

$$v_R = n \cdot \sin \theta + v \cdot \cos \theta \quad \text{[Equation 20]}$$

The two orthogonal vectors $v_1$ and $v_2$ may be expressed by N-dimensional complex vectors, which may be expressed by 2N-dimensional real vectors $u_1$ and $u_2$ in the following equation.

$$v_1 = [v_{1,1} v_{1,2} \ldots v_{1,N}]^T$$

$$v_2 = [v_{2,1} v_{2,2} \ldots v_{2,N}]^T$$

$$u_1 = [Re\{v_{1,1}\} Im\{v_{1,1}\} Re\{v_{1,2}\} Im\{v_{1,2}\} \ldots Re\{v_{1,N}\} Im\{v_{1,N}\}]^T$$

$$u_2 = [Re\{v_{2,1}\} Im\{v_{2,1}\} Re\{v_{2,2}\} Im\{v_{2,2}\} \ldots Re\{v_{2,N}\} Im\{v_{2,N}\}]^T \quad \text{[Equation 21]}$$

Herein, the tangent vector for $u_1$ may be expressed as $u_2$, and the tangent vector for $u_2$ may be expressed as $-u_1$. Accordingly, vectors $u_{R,1}$ and $u_{R,2}$ obtained through rotation by a specific rotation angle $\theta$ ($0 \leq \theta \leq \pi$) may be expressed by the following equation.

$$u_{R,1} = u_2 \cdot \sin\theta + u_1 \cdot \cos\theta$$

$$u_{R,2} = u_1 \cdot \sin\theta + u_2 \cdot \cos\theta \quad \text{[Equation 22]}$$

In Equation 21, $u_{R,1}$ and $u_{R,2}$ may be expressed with N-dimensional complex vectors $v_{R,1}$ and $v_{R,2}$. For a 2D plane defined by $v_1$ and $v_2$, linear transformation is defined as follows.

$$M_R = [v_1 \ v_2] \begin{bmatrix} v_1^H \\ v_2^H \end{bmatrix} [v_{R,1} \ v_{R,2}] \begin{bmatrix} v_1^H \\ v_2^H \end{bmatrix} \quad \text{[Equation 23]}$$

Next, a beam vector w for the N-dimensional space is transformed into $w_R$ through rotation according to Equation 23.

$$w_\perp = w - \sum_{i=1}^{2} (v_i^H w) \cdot v_i \quad \text{[Equation 24]}$$

$$w_R = M_R w + w_\perp$$

Figure 11:
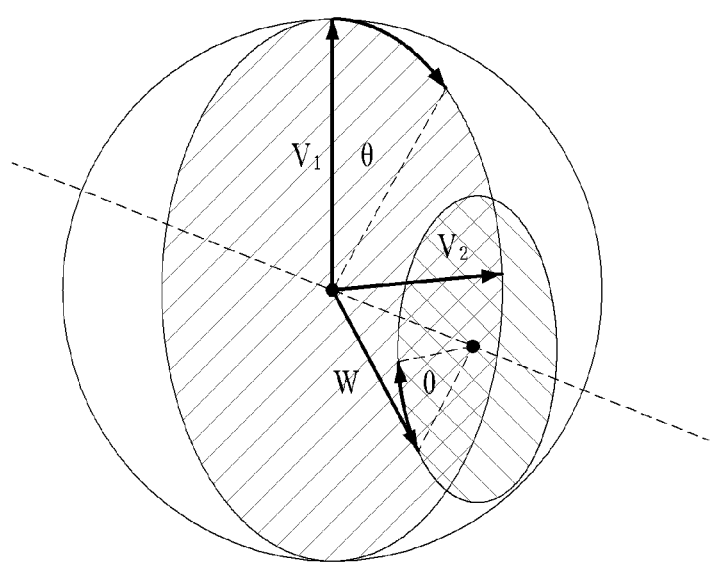
FIG. 11 illustrates rotational transformation of a specific beam.

In this method, the UE may signal, to the BS, information about rotational transformation applied to a beam vector by feeding back two orthogonal vectors and a rotation angle $\theta$. For example, the codebook for $W^{(1)}$ of the LTE Rel-10 8Tx codebook may indicate a specific beam set, and the vector components may be subjected to rotational transformation in the plane defined by $v_1$ and $v_2$ according to the operation of item (2.1). FIG. 11 illustrates rotational transformation of a specific beam w in a specific beam set using the aforementioned method according to Equation 24.

(2.2) Q-D (Q≥2) Rotation Feedback

According to an embodiment of the present invention, in the case where N virtual antenna ports are formed through transformation of M antenna ports, the BS and the UE may define a codebook for a combination of Q ($2 \leq Q \leq N$) orthogonal unit vectors in an N-dimensional space, indicate a base prior to rotational transformation by indicating $v_1, v_2, \ldots$, and $v_Q$ which are a codeword combination in the codebook, and indicate a base after the rotational transformation by indicating $v_{R,1}, v_{R,2}, \ldots$, and $v_{R,Q}$ which are another codeword combination in the codebook. Thereby, the UE may signal rotation by which the UE has corrected the existing N-Tx codebook.

According to this embodiment, when $v_1, v_2, \ldots, v_Q$ and $v_{R,1}, v_{R,2}, \ldots, v_{R,Q}$ are given, a matrix for rotational transformation similar to that of Equation 23 may be defined by the following equation.

$$M_R = [v_1 \ v_2 \ \cdots \ v_Q] \begin{bmatrix} v_1^H \\ v_2^H \\ \vdots \\ v_Q^H \end{bmatrix} [v_{R,1} \ v_{R,2} \ \cdots \ v_{R,Q}] \begin{bmatrix} v_1^H \\ v_2^H \\ \vdots \\ v_Q^H \end{bmatrix} \quad \text{[Equation 25]}$$

Next, a beam vector w for the N-dimensional space is transformed into $w_R$ through rotational transformation according to Equation 25.

$$w_\perp = w - \sum_{i=1}^{Q} (v_i^H w) \cdot v_i \quad \text{[Equation 26]}$$

$$w_R = M_R w + w_\perp$$

In this method, the UE may signal information about the rotational transformation to the BS.

The methods in items (2.1) and (2.2) present not only rotation information about a specific vector, but also rotation information about rotation of components of a vector which are included in a specific subspace. Accordingly, this method may be utilized to provide rotation information about two or more vector sets. That is, this method may be utilized as information for rotating a codebook whose rank is greater than or equal to 2.

In this case, the UE does not use the codebook for the N-dimensional space for the base after rotational transformation. Instead, when $v_1, v_2, \ldots$, and $v_Q$ are given, the UE may separately define a codebook for a combination of Q orthogonal unit vectors, and feed back codewords $v'_{R,1}, v'_{R,2}, \ldots$, and $v'_{R,Q}$ belonging to the codebook. Thereby, rotational transformation in the Q-dimensional space defined by the combination of $v_1, v_2, \ldots$, and $v_Q$ may be indicated. In this case, Equation 25 may be modified as follows.

$$M_R = [v_1 \ v_2 \ \cdots \ v_Q][v'_{R,1} \ v'_{R,2} \ \cdots \ v'_{R,Q}] \begin{bmatrix} v_1^H \\ v_2^H \\ \vdots \\ v_Q^H \end{bmatrix} \quad \text{[Equation 27]}$$

(2.3) Accumulation of Rotation

According to an embodiment of the present invention, in the case where N virtual antenna ports are formed through transformation of M antenna ports, when the UE feeds back rotation information according to the operation of item (2.1) or (2.2), the UE may additionally feed back whether to initialize or accumulate the rotation information when feeding back the rotation information. Rotation in a constrained space according to operation of the present invention may divert the beam in consideration of feedback load, but it may be difficult to correct a codebook through one rotation if the main channel direction of a virtual antenna port channel significantly differs from the beam direction supported by the existing codebook.

Accordingly, in this embodiment, the UE may signal 1-bit information indicating whether the corresponding rotation to be applied overlaps the previous rotation in addition to the feedback information about the rotation. For example, if the information is '0', this may indicate an operation of accumulating and applying the current rotation for the codebook transformed by the previous rotation. If the information is '1', this may indicate an operation of initializing the previous rotation and applying rotation that is currently fed back to the existing codebook which does not consider rotation or an initial codebook. In this case, the UE may perform the feedback operation only for the base $v_{R,1}, v_{R,2}, \ldots,$ and $v_{R,Q}$ after rotational transformation in the operation of item (2.2), and assume that the base $v_1, v_2, \ldots,$ and $v_Q$ prior to the rotational transformation is information of $v_{R,1}, v_{R,2}, \ldots,$ and $v_{R,Q}$ fed back at the previous time. If the 1-bit information indicates '1' and thus the previous rotation is initialized, the base of $v_1, v_2, \ldots,$ and $v_Q$ prior to the rotational transformation is assumed to have a default value pre-agreed on between the BS and the UE.

Figure 12:
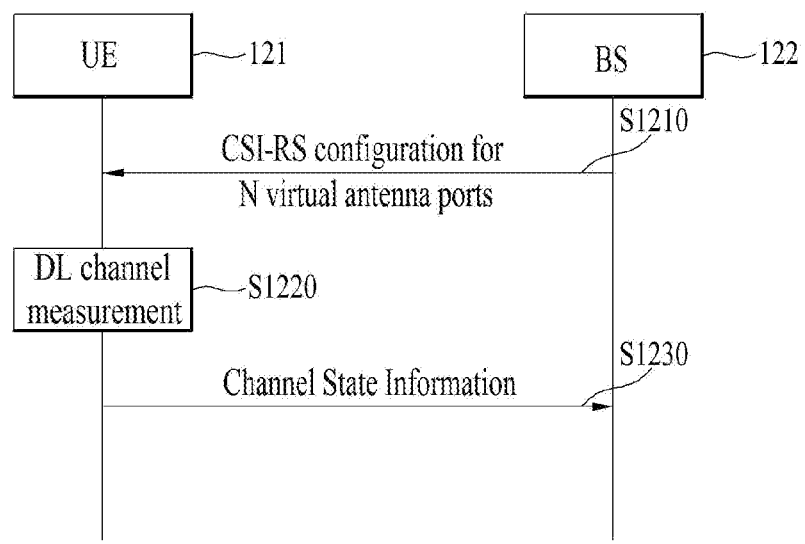
FIG. 12 illustrates an operation according to an embodiment of the present invention.

FIG. 12 illustrates an operation according to an embodiment of the present invention.

The operation illustrated in FIG. 12 is related to channel state reporting about a downlink channel transmitted through M antenna ports arranged in 2 dimensions. As shown in FIG. 9, the antenna ports arranged in two dimensions (namely, 2D antenna ports) may be virtualized or formed as a specific number of virtual antenna ports through transformation such as beamforming of a corresponding vertical antenna group.

The UE 121 may receive, from the BS 122, configuration of a channel state information-reference signal (CSI-RS) for N virtual antenna ports formed by applying beamforming to each vertical antenna group of the M antenna ports arranged in 2 dimensions (S1210).

The UE may calculate channel state information about the downlink channel using the received CSI-RS configuration (S1220). The reported channel state information is a combination of Q unit vectors orthogonal to each other in the N-dimensional space. Alternatively, the reported channel state information may include the first codeword and a second codeword acquired through rotational transformation of the first codeword.

Then, the UE may report the calculated channel state information to the BS (S1230). The BS may perform scheduling for the UE based on the reported channel state information.

The UE may also transmit, to the serving cell, an indicator indicating whether the rotational transformation is accumulated and applied to the most recently transmitted channel state information. If the rotational transformation is accumulated and applied to the most recently transmitted channel state information, the first codeword is not subjected to the reporting, and thus a codeword prior to rotational transformation for the current channel state reporting may be assumed to be a codeword included in the most recently transmitted channel state information.

The operation of the UE or BS shown in FIG. 12 may include not only the embodiment illustrated with reference to FIG. 12 but also at least one of the embodiments of the present invention described above.

Figure 13:
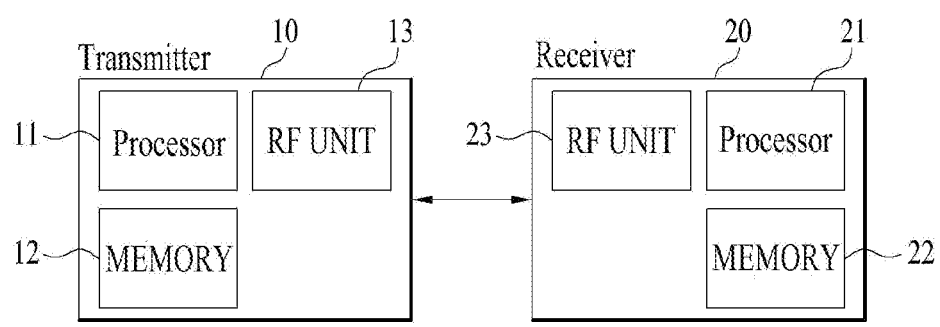
FIG. 13 is a block diagram illustrating apparatuses for implementation of embodiments of the present invention.

FIG. 13 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 or to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

The invention claimed is:

1. A method for performing channel state reporting on a downlink channel transmitted through M two-dimensionally arranged antenna ports, the method implemented by a user equipment (UE) and comprising:
receiving a channel state information-reference signal (CSI-RS) configuration for N virtual antenna ports formed by applying beamforming to each vertical antenna group of the M two-dimensionally arranged physical antenna ports matrix;
calculating channel state information (CSI) about the downlink channel using the received CSI-RS configuration; and
reporting the CSI to a serving cell associated with the UE, wherein the reported CSI comprises information about rotational transformation of a first codeword in a codebook for a combination of Q unit vectors orthogonal to each other in an N-dimensional space,
wherein the reported CSI further comprises an indicator indicating whether the rotational transformation to be applied overlaps with a previous rotational transformation, and
wherein N and Q are integers satisfying $2 \leq Q \leq N$, and M is an integer satisfying $2 \leq M$.

2. The method according to claim 1, wherein, when the indicator is reported to the serving cell, the first codeword is excluded from the reported CSI.

3. The method according to claim 1, wherein, when the indicator indicates that the rotational transformation overlaps with the previous rotational transformation, the rotational transformation is not applied and a default codeword is used in place of the first codeword.

4. The method according to claim 1, wherein the reported CSI contains the first codeword and a second codeword acquired through rotational transformation of the first codeword.

5. A user equipment (UE) configured to perform channel state reporting on a downlink channel transmitted through M two-dimensionally arranged antenna ports, the UE comprising:
a transmitter and a receiver; and
a processor, operably coupled to the transmitter and the receiver, that:
controls the receiver to receive a channel state information-reference signal (CSI-RS) configuration for N virtual antenna ports formed by applying beamforming to each vertical antenna group of the M two-dimensionally arranged physical antenna ports matrix; and
calculates channel state information (CSI) about the downlink channel using the received CSI-RS configuration; and
reports the CSI to a serving cell associated with the UE, wherein the reported CSI comprises information about rotational transformation of a first codeword in a codebook for a combination of Q unit vectors orthogonal to each other in an N-dimensional space,
wherein the reported CSI comprises an indicator indicating whether the rotational transformation to be applied overlaps with a previous rotational transformation, and
wherein N and Q are integers satisfying $2 \leq Q \leq N$, and M is an integer satisfying $2 \leq M$.

6. The UE according to claim 5, wherein, when the indicator is reported to the serving cell, the first codeword is excluded from the reported CSI.

7. The UE according to claim 5, wherein, when the indicator indicates that the rotational transformation overlaps with the previous rotational transformation, the rotational transformation is not applied and a default codeword is used in place of the first codeword.

8. The UE according to claim 5, wherein the reported CSI contains the first codeword and a second codeword acquired through rotational transformation of the first codeword.

* * * * *